Figure 10:
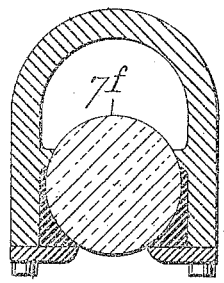
Figure 11:
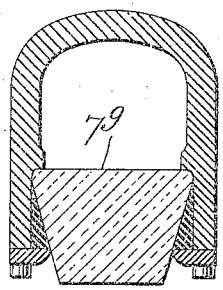
Figure 12:
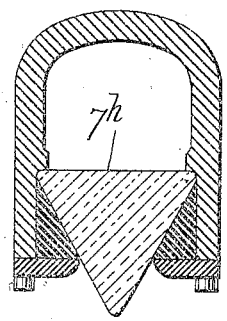
Figure 13:
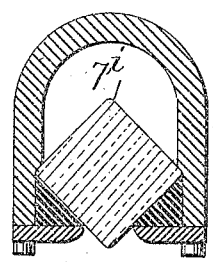
Figure 14:
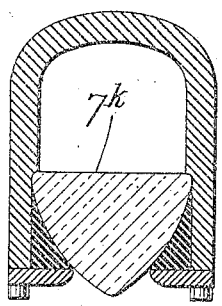
Figure 15:
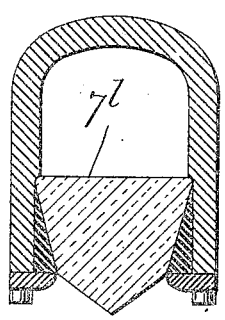

No. 821,872. PATENTED MAY 29, 1906.
C. B. & F. W. HODGES.
GAGE GLASS.
APPLICATION FILED DEC. 24, 1903.
3 SHEETS—SHEET 1.
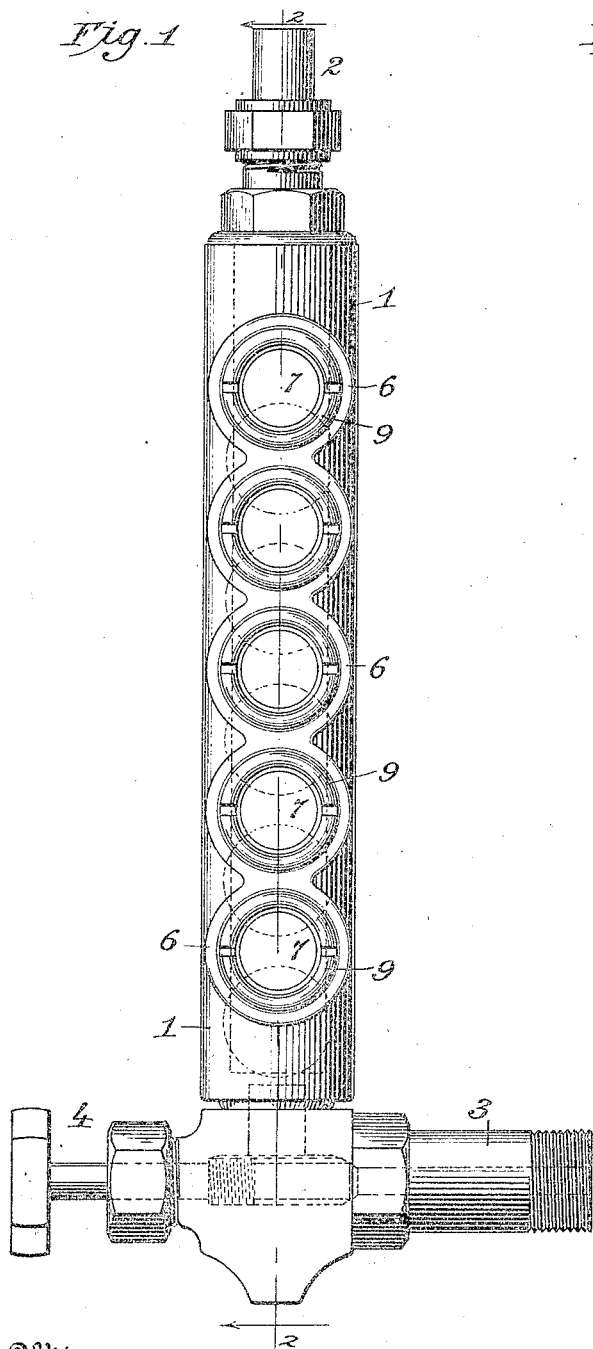
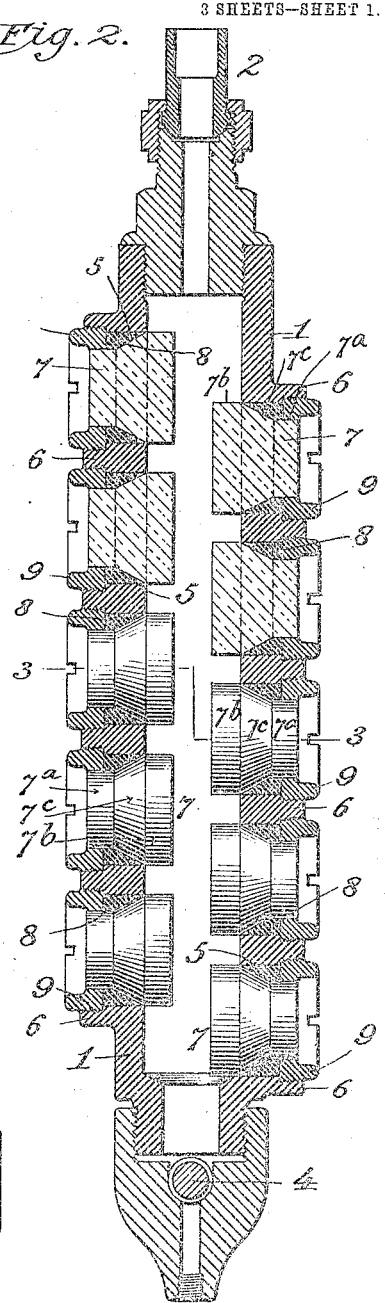

No. 821,872. PATENTED MAY 29, 1906.
C. B. & F. W. HODGES.
GAGE GLASS.
APPLICATION FILED DEC. 24, 1903.
3 SHEETS—SHEET 2.
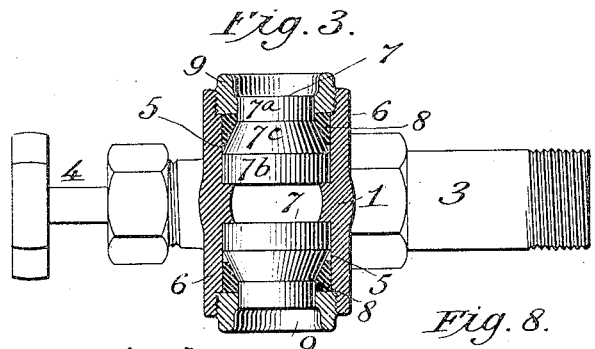
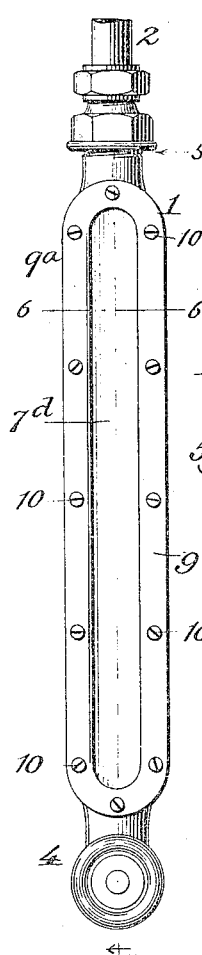
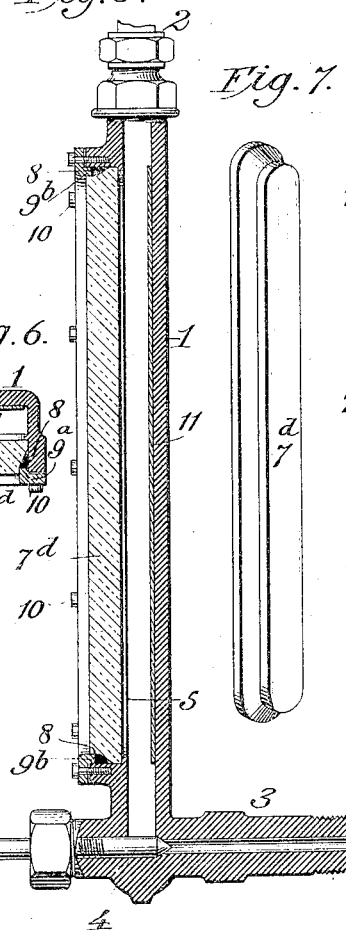
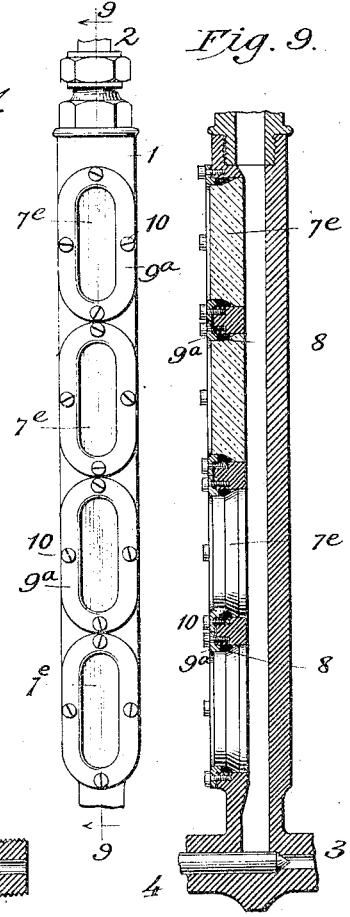
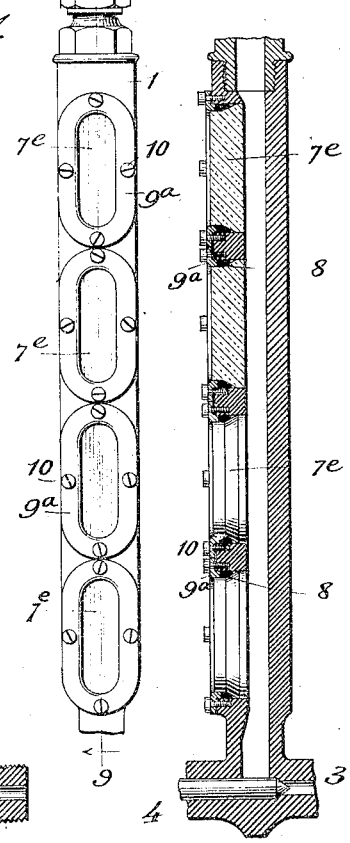
Witnesses
Inventors
Clarence B. Hodges,
Frederick W. Hodges,
by
Attorneys No. 821,872. PATENTED MAY 29, 1906.
C. B. & F. W. HODGES.
GAGE GLASS.
APPLICATION FILED DEC. 24, 1903.

3 SHEETS—SHEET 3.

Witnesses
Sidney P. Hollingsworth
C. B. Bull

Inventors
Clarence B. Hodges,
Frederick W. Hodges,
by
Attorneys

UNITED STATES PATENT OFFICE.

CLARENCE B. HODGES AND FREDERICK W. HODGES, OF DETROIT, MICHIGAN.

GAGE-GLASS.

No. 821,872.  Specification of Letters Patent.  Patented May 29, 1906.

Application filed December 24, 1903. Serial No. 186,496.

*To all whom it may concern:*

Be it known that we, CLARENCE B. HODGES and FREDERICK W. HODGES, citizens of the United States, residing at Detroit, in the county of Wayne and State of Michigan, have invented certain new and useful Improvements in Gage-Glasses, of which the following is a specification, reference being had to the accompanying drawings, forming part thereof.

This invention relates to improvements in gage-glasses, more particularly for use with locomotives, but which are adapted for use in marine, stationary, or other practice where gage-glasses are required.

The rapidly-increasing pressures of steam used more especially in the modern locomotive have made the tubular form of gage-glass ordinarily used unsafe. This fact is recognized by many railroads, which have removed gage-glasses from their locomotives, although the advantages derived by the engineman and others in the use of such a glass, so long as its safety is insured, is well recognized, and therefore various means have been suggested and devised for producing a safe glass, but so far as we are advised with but little success.

In the more ordinary form of gage-glass the upper portion of the tube subjected to the action of steam is quickly cut out or frosted in appearance, so that the water-level becomes indistinct, and this condition having been reached it becomes necessary to throw away the entire glass and replace it with a new one.

In our improvement, the glass being of a sectional character—that is to say, made up of a metallic casing and removable glasses of great strength—this objection is obviated, inasmuch as any individual glass, each one being separate from all the others, may be removed and repolished or another substituted therefor.

In our invention the casing and the glasses are of such character that the entire structure is able to withstand the highest pressures carried, and special means are devised to provide the necessary strength in the construction of the casing, the character of the glass or glasses entering thereinto, and the mode of packing the glass.

A very important feature of this invention is in the packing, which acts in such manner that the glass is not subjected to the strains of packing or expansion and contraction, as is the case with all other glasses which have come to our notice.

In our invention the glass is so packed that the strain comes upon its sides instead of upon its face, thereby enabling the making of a perfect joint with less pressure and less liability of breakage than in ordinary practice, and the construction and action are such that in the preferred form, the pressure being on the interior of the glass, the latter packs itself automatically, the sides being so arranged in relation to the packing that the pressure on the interior face of the glass forces said glass outwardly into the packing, thereby making a perfect joint on the side surfaces of the glass.

Another feature of our improvement consists in a sectional glass in which the glasses proper are located opposite to each other or at various angles with reference to a line drawn through the vertical section of the instrument. In some instances a reflector is employed in connection with our gage-glass whereby the better to enable the observer to see the exact level of the water.

Other features of improvement will appear in the description which follows and are more particularly pointed out in the claims.

In the accompanying drawings, Figure 1 is a front elevation of our invention. Fig. 2 is a vertical longitudinal section on the line 2 2 of Fig. 1. Fig. 3 is a transverse section on the line 3 3 of Fig. 2. Fig. 4 is an elevation of a modified form of the invention. Fig. 5 is a vertical longitudinal section on the line 5 5 of Fig. 4. Fig. 6 is a transverse section on the line 6 6 of Fig. 4. Fig. 7 shows the glass of Figs. 4, 5, and 6 removed from the casing. Fig. 8 shows a further modified form of the invention, and Fig. 9 a vertical longitudinal section on the line 9 9 of Fig. 8. Figs 10 to 15, inclusive, show modifications in the shape of the glasses.

Similar numerals of reference indicate similar parts in the respective figures.

Referring more particularly to Figs. 1 and 2, the metallic casing 1 has the usual upper steam connection 2 and the lower water connection 3, the latter being controlled by means of the valve 4. The casing is provided on opposite sides with perforations, and, as shown in Figs. 1 and 2, the axes of the openings on the opposite sides are not concentric, although it is fully within our invention that the said oppositely-arranged openings may be concentric. Each opening 5 is furnished with an outer boss 6, interiorly threaded, as shown, and within each opening is placed an observation-glass 7 of substantial thickness to withstand the pressure to which it is subjected.

As shown in Figs. 1, 2, and 3 the observation-glass is of the bull's-eye type, its surface partaking of three geometrical figures—an outer smaller cylinder $7^a$, an inner larger cylinder $7^b$, and an intervening frusto-conical figure $7^c$—the two cylinders and the frusto-conical central portion uniting to form the observation-glass, such as is shown exteriorly and in section in Fig. 2. An annular packing 8 surrounds each observation-glass, an exterior portion of the glass bearing upon or against the interior of said packing, while screwed into each threaded boss 6 is a threaded cap 9, which when in position binds against the packing and compresses it upon the glass. It is obvious that the internal pressure to which the glass or series of glasses is subjected tends to force said glass or glasses against the packing, so that the greater the pressure to which the glass or glasses are exposed the more perfect is the automatic packing action. The thickness of the observation-glasses is such that they will readily withstand the pressure to which they are subjected.

In Figs. 4, 5, and 6 are seen modifications of our invention, but one observation-glass $7^d$ being shown, extending substantially the length of the metallic casing. In this case the glass $7^d$ is given the same shape or formation upon its edge as is found upon the exterior of the observation-glasses seen in Figs. 1, 2, and 3 in so far as a central tapered or inclined portion is provided adapted to be pressed up by internal pressure against the same form of packing as has already been described with reference to Figs. 1, 2, and 3. As seen in Figs. 4, 5, and 6 the cap $9^a$ is of modified form as compared with the cap 9 of the previously-described figures, consisting of a plate having a shoulder or tongue $9^b$, which is forced up against the packing 8 by means of bolts 10. The plate is open centrally, so as to freely discover the observation-glass. Fig. 7 shows in perspective the modified form of glass employed in Figs. 4, 5, and 6.

In Figs. 8 and 9 the observation-glass $7^e$ partakes of the formations of the observation-glasses of Figs. 1, 2, and 3 and 4, 5, and 7—that is to say, in Figs. 8 and 9 the glass is not circular in cross-section, as in the first-named figures, but is elongated, being circular at its ends, but not elongated to the extent found in Figs. 4, 5, and 7. In other words, the observation-glasses of Figs. 8 and 9 are the same as in Figs. 4, 5, and 7 and are provided with the same description of caps except that the glasses and caps are shorter, a series being used instead of a single glass and cap. The packing in all cases is the same in principle and operation, acting in all forms of the invention with a glass having a tapered side or edge or its equivalent which is pressed up against the packing by pressure, the glass or glasses thus automatically seating themselves against the packing.

While in Figs. 1 to 9, both inclusive, the glasses are shown of uniform shape in cross-section, it is within our invention to vary the shape of the glass, as indicated in Figs. 10 to 15, both inclusive. Thus the glass may be either conical, triangular, or polygonal and either square or round in cross-section or a modification of any of such forms and capable of being packed in substantially the manner hereinbefore described and accomplish the same results. It will be understood that such modifications in the shape of the glass extend to such as is of the bull's-eye type or having the elongation shown in Figs. 4, 5, 7, 8, and 9.

Figs. 10 to 15, both inclusive, show in transverse section various shapes of glasses. These glasses are indicated by $7^f, 7^g, 7^h, 7^i, 7^k$, and $7^l$. Fig. 10 may represent in cross-section either a cylindrical or a spherical glass, and Figs. 11 to 15, both inclusive, may indicate glasses of the bull's-eye type or of prismatic character either of the elongated form, as indicated in Figs. 4, 5, and 7, or of the shorter form shown in Figs. 8 and 9.

In Figs. 5 and 6 a reflector 11 is shown placed longitudinally of and at the back of the casing 1, by means of which the level of water is better observed and reflected through the observation-glass. A reflector may be used with any form of observation-glass or series of such glasses as herein shown as entering into our invention.

Another important advantage incident to our invention is that the side surfaces of a glass of sufficient thickness to safely withstand the pressure and to permit of its being packed in the manner described may be so polished as to act as mirrors, not only for inwardly reflecting the light, but also for reflecting the movement of liquid within the casing, thereby widely increasing the range of vision.

We do not restrict ourselves to the exact details of construction, combination, and arrangement herein set forth, it being obvious that minor variations thereof not involving the exercise of invention may be made by the skilled mechanic, and such departures from what is herein described and claimed not involving invention we consider as within the scope and terms of our claims.

Having thus described our invention, we claim—

1. A gage-glass consisting of a metallic casing having an aperture, combined with an observation-glass adapted for insertion in said aperture and having sides inclined with reference to a line drawn horizontally through said glass from front to rear and at a right angle to the front face of the casing, the sides of said glass diverging from the exterior toward the interior of the casing, a packing inclosed within said aperture and embracing the inclined sides of the glass, and means for engaging said packing, the construction being such that the glass under internal pressure is self-seating against the packing, substantially as set forth.

2. A gage-glass consisting of a metallic casing having apertures upon opposite sides thereof, combined with observation-glasses each adapted for insertion in one of said apertures and having sides inclined with reference to a line drawn horizontally through said glass from front to rear and at a right angle to the front face of the casing, the sides of said glass diverging from the exterior toward the interior of the casing, a packing for each glass inclosed within one of said apertures and embracing the sides of the glass, and means for engaging said packing, the construction being such that the glass under internal pressure is self-seating against the packing, substantially as set forth.

3. A gage-glass consisting of a perforated metallic casing combined with transparent means having sides inclined with reference to a line drawn horizontally through said means from front to rear and at a right angle to the front face of the casing, the sides of said transparent means diverging from the exterior to the interior of the casing, reflecting means in the rear of said transparent means, a packing for the transparent means, and means for engaging said packing, the construction being such that the transparent means under pressure is self-seating against the packing, substantially as set forth.

4. A gage-glass consisting of a metallic casing having an aperture combined with an observation-glass adapted to fit said aperture but leaving an annular space between the sides of the glass and the walls of the aperture, said space converging from the exterior toward the interior of the casing, a packing inclosed within said annular space, and means for retaining said packing in place, the construction being such that the strain of the packing is on the sides of the glass, substantially as set forth.

5. A gage-glass consisting of a metallic casing having an aperture combined with an observation-glass having its sides inclined with reference to a line drawn horizontally through said glass from front to rear and at a right angle to the front face of the casing, the sides of said glass diverging from the exterior toward the interior of the casing, the inclined sides of the observation-glass being arranged to internally reflect the movement of the liquid within the casing, and a packing against which the glass under internal pressure is self-seating, substantially as set forth.

In testimony whereof we hereunto set our hands.

CLARENCE B. HODGES.
FREDERICK W. HODGES.

Witnesses:
A. B. WETMORE,
JOHN COYNE.